3,508,023
APPARATUS FOR HIGH FREQUENCY HEATING OF ARTICLES SUCCESSIVELY CONVEYED THERETHROUGH
Kazunori Ueda, Neyagawa-shi, Shigeru Araki, Hirakata-shi, Minoru Yokoyama, Osaka, Toshitaka Onizuka, Kadoma-shi, Morimasa Ogawa, Takarazuka-shi, and Mituru Shimizu, Nara-shi, Japan, assignors to Matsushita Electric Industrial Co., Ltd., Osaka, Japan, a corporation of Japan
Filed Mar. 11, 1968, Ser. No. 712,290
Claims priority, application Japan, Mar. 16, 1967, 42/16,920, 42/16,921, 42/16,922, 42/16,923, 42/16,924, 42/16,925
Int. Cl. H05b 5/00, 9/06
U.S. Cl. 219—10.55                                5 Claims

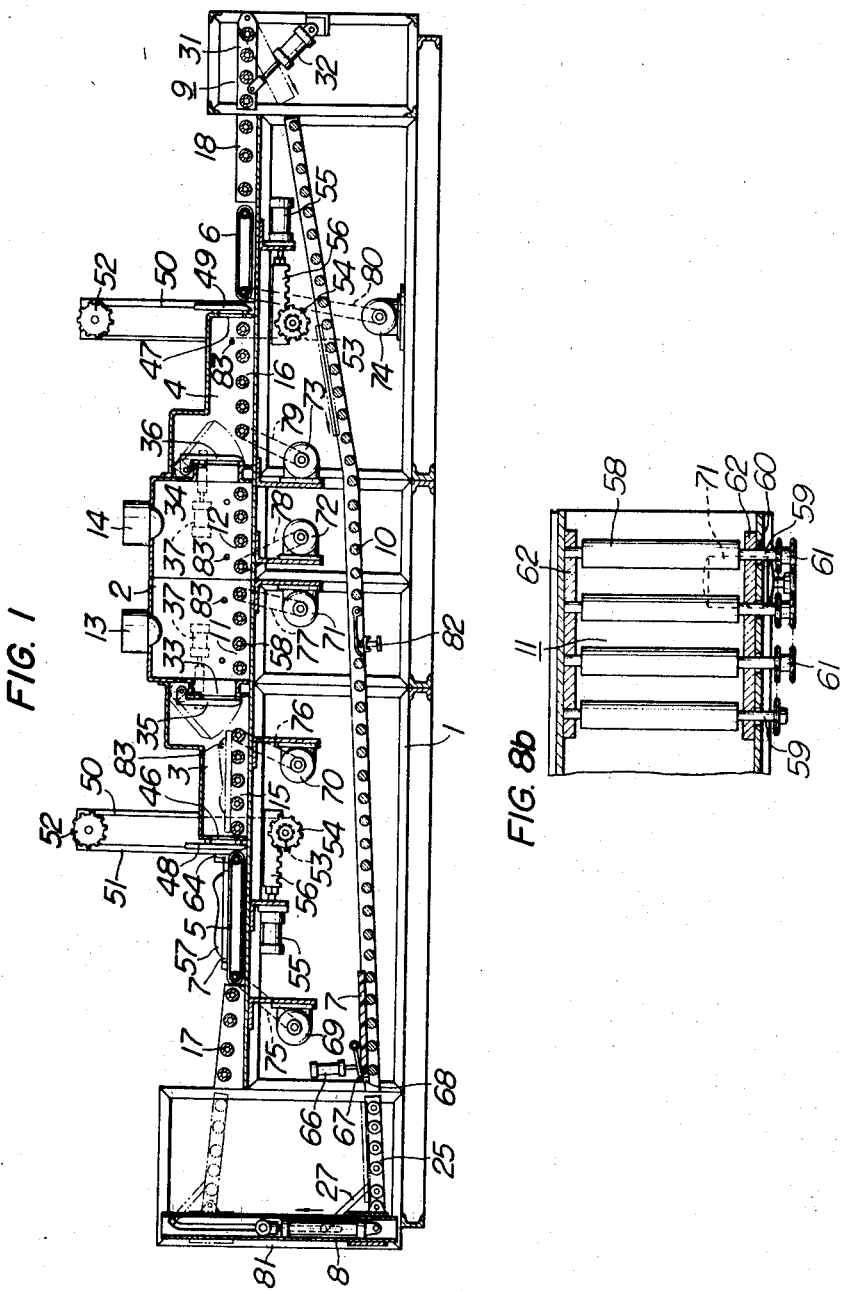

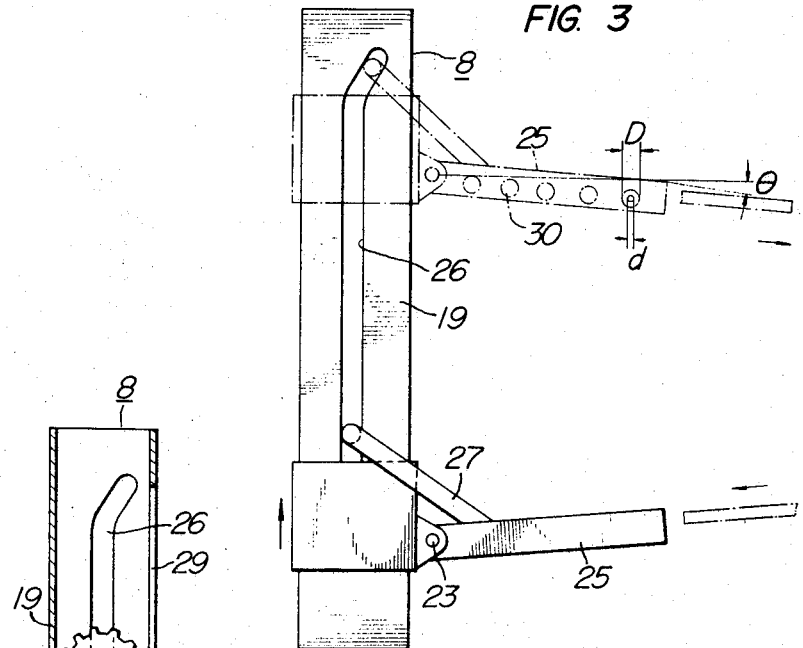
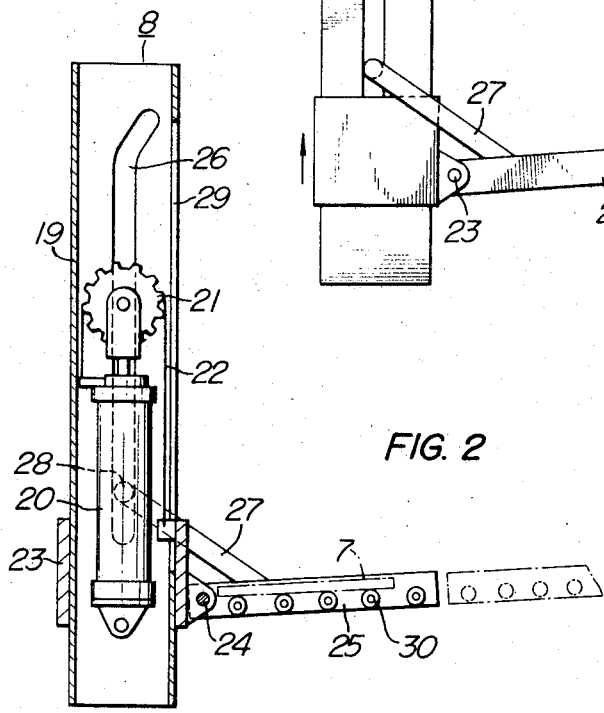

---

ABSTRACT OF THE DISCLOSURE

A high frequency heating apparatus having a heating chamber equipped with a high frequency generator and means for successively and automatically conveying articles such as foodstuffs into and out of the heating chamber so that the articles can successively be heat-treated in large quantities by the high frequency energy in a short period of time.

---

This invention relates to apparatus for high frequency heating of articles successively conveyed therethrough for the mass treatment of such articles in a short period of time.

In the last step of the manufacture of cakes such as, for example, sponge-cake (castella), the cake packed in a case is fed into a high frequency heating chamber for the sake of sterilization. In such a heating apparatus of the kind employing high frequency energy, it is generally required to avoid external leakage of the high frequency energy from the heating chamber.

It has been common practice in conventional high frequency heating apparatus of this kind to temporarily stop the generation of high frequency energy during the supply and discharge of an article into and out of the high frequency heating chamber in order to avoid objectionable external leakage of the high frequency energy, but this manner of operation has inevitably resulted in a waste of heating time and in an extension of the time required for treatment. In addition to the above drawback, repeated on-off switching of the high frequency generator which may be a magnetron adversely affects the proper functioning of the high frequency generator and associated switches, thereby shortening the service life of these elements. In another form of high frequency heating apparatus heretofore proposed in the art, generation of high frequency energy is not interrupted even for a moment during the supply and discharge of an article into and out of the heating chamber, and a load, which is water, is continuously circulated through the inlet and outlet portions of the heating chamber so that the high frequency energy generated in the article supply and discharge phase of the continuous operation can be absorbed by the water, thereby preventing objectionable leakage of the high frequency energy to the exterior. However, such an apparatus has been defective in that a portion of the high frequency energy to be completely absorbed by an article to be heated is continually absorbed by the water, resulting in a poor heating efficiency. In view of the above fact, a high frequency heating apparatus capable of automatically, efficiently and successively heating a large quantity of articles in a short period of time has not been proposed yet.

The present invention is intended to overcome the defects involved in conventional high frequency heating apparatus as described above and contemplated the provision of a novel and improved high frequency heating apparatus which is characterized by having a high frequency heating chamber equipped with high frequency generator means and having an inlet and an outlet, a front auxiliary chamber disposed on the front side of said heating chamber in contiguous relation thereto and having an inlet, a rear auxiliary chamber disposed on the rear side of said heating chamber in contiguous relation thereto and having an outlet, a supply conveyor and a delivery conveyor for conveying articles carried by individual pallets successively into and out of said chambers, a pallet lifting unit disposed on the front side of said supply conveyor, a pallet returning unit disposed on the rear sides of said delivery conveyor, a pallet returning conveyor disposed between said pallet lifting unit and said pallet returning unit for conveying said pallet from said pallet returning unit to said pallet lifting unit, gates opening and closing the inlet of said front auxiliary chamber and the inlet of said heating chamber, respectively, and adapted so as not to be opened simultaneously, and gates opening and closing the outlet of said heating chamber and the outlet of said rear auxiliary chamber, respectively, and adapted so as not to be opened simultaneously.

It is an object of the present invention to provide a high frequency heating apparatus of the kind described above in which articles to be heat-treated are automatically conveyed into and out of the high frequency heating chamber by being carried by individual pallets circulating through the apparatus by means of the conveyors so that the articles in large quantities can successively be heat-treated within a short period of time, thus reducing the manpower required for the treatment, while at the same time, the high frequency energy can be prevented from leaking externally during the supply and discharge of the articles into and out of the high frequency heating chamber in spite of the fact that the high frequency energy is continuously generated within the heating chamber.

Another object of the present invention is to provide a high frequency heating apparatus of the kind described above which is provided with a mechanism for swingingly opening and closing the gates so as to minimize the space required for the opening and closing movement of the gates opening and closing the high frequency heating chamber.

A further object of the present invention is to provide a high frequency heating apparatus of the kind described above in which means are provided to regulate the position of the articles within the high frequency heating chamber and the front and rear auxiliary chambers prior to the opening of the gates opening and closing these chambers.

Still another object of the present invention is to provide a high frequency heating apparatus of the kind described above in which the heat-treated articles successively conveyed out of the high frequency heating chamber are unloaded from the pallets, which are then automatically returned to a position adjacent to the pallet lifting unit and are lifted thereby to be delivered onto the supply conveyor so as to ensure smooth circulation of the pallets through the apparatus.

In the accompanying drawings:
FIG. 1 is a vertical sectional view of the high frequency heating apparatus embodying the present invention;
FIG. 2 is an enlarged vertical sectional view of a pallet lifting unit in the apparatus according to the present invention;

FIG. 3 is a side elevational view of the pallet lifting unit;

FIG. 8a is a sectional view taken on the line I—I in FIG. 7a;

FIG. 8b is a sectional view taken on the line II—II in FIG. 8a; and

Figure 4:
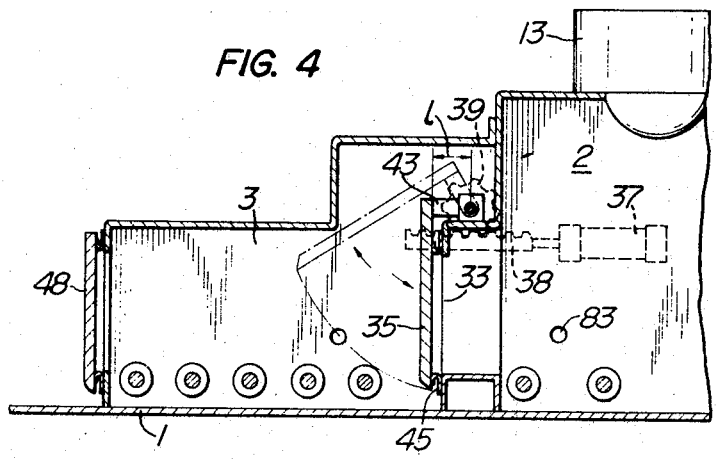
FIG. 4 is an enlarged vertical sectional view of an opening and closing mechanism for a gate opening and closing the heating chamber in the apparatus according to the present invention.

Referring now to FIG. 1 of the drawings, the high frequency heating apparatus embodying the present invention comprises a generally frame-like base 1 for mounting thereon all of the means and parts constituting the heating apparatus. At a position intermediate between the front and rear ends of the base 1, there is mounted a generally box-like heating chamber 2 which is formed by combining a plurality of cabinets of symmetrical shape. A front auxiliary chamber 3 and a rear auxiliary chamber 4 are disposed, respectively, on the front side and on the rear side of the heating chamber 2 in contiguous relation to the latter. A supply conveyor 5 and a delivery conveyor 6 are disposed on the front side and on the rear side of the front and rear auxiliary chambers 3 and 4, respectively. An article 57 to be heat-treated is loaded on a pallet 7 when the latter is situated at the loading station, that is, on the supply conveyor 5 and is unloaded from the pallet 7 when the latter is brought to the unloading station, that is, on the delivery conveyor 6: A pallet lifting unit 8 is disposed on the front side of the supply conveyor 5 so as to lift the unloaded pallets 7 one by one and bring them onto the supply conveyor 5 again. A pallet returning unit 9 is disposed on the rear side of the delivery conveyor 6 so as to return the unloaded pallets 7 by gravity to a position adjacent to the pallet lifting unit 8. The gravitational return of the unloaded pallets 7 is effected by a forwardly tilting returning conveyor 10 of the roller type which extends between the pallet lifting unit 8 and the pallet returning unit 9 in the lower part of the base 1. The respective cabinets constituting the heating chamber 2 are equipped internally with transfer conveyors 11 and 12 of the roller type and high frequency generators such as magnetrons 13 and 14 for generating the high frequency energy in the form of a radio wave. The respective front and rear auxiliary chambers 3 and 4 are internally equipped with transfer conveyors 15 and 16 of the roller type. Furthermore, between the supply conveyor 5 and the pallet lifting unit 8, and between the delivery conveyor 6 and the pallet returning unit 9, there are roller conveyors 17 and 18 of the self-rolling type, respectively.

The pallet lifting unit 8 has a structure as shown in FIGS. 2 and 3. A fluid-operated cylinder such as an air cylinder 20 is securely fixed to the inside of a hollow square column 19, and a sprocket 21 is rotatably mounted on the top end of the piston slidably received in the air cylinder 20. A chain 22 passes around the sprocket 21 and is anchored at one end to a portion of the air cylinder 20 and at the other end to a vertically movable block 23 slidably mounted on the square column 19. A carrier member 25 having therein a built-in roller conveyor 30 is pivotally connected to the vertically movable block 23 by means of a rotary joint 24, and is arranged to normally take a forwardly tilting position as shown in FIG. 2. Aligned guide slots 26 are bored through the opposite side walls of the square column 19 and have their upper end curved to incline toward the carrier member 25. A roller 28 is slidably received for vertical movement in each guide slot 26, and a link 27 is pivoted at one end to each roller 28 and at the other end to a suitable portion of the carrier member 25. Therefore, in its lower position as shown by the solid lines in FIG. 3, the carrier member 25 is situated opposite to the front end of the returning conveyor 10 in order to receive an unloaded pallet 7 thereon with the free end of the carrier member 25 raised upwardly relative to its pivoted end so that the unloaded pallet 7 may not drop off the carrier member 25. On the other hand, in its upper position as shown by the phantom lines, the carrier member 25 which is arranged for swinging movement by means of the links 27 has its rear or free end lowered relative to the front or pivoted end because of the fact that the upper ends of the guide slots 26 are inclined or curved toward the carrier member 25, and consequently the carrier member 25 is supported in such an angular position that a gravitational free sliding movement of the pallet 7 takes place. A slot 29 for loosely receiving therein a portion of the vertically movable block 23 and thereby limiting the vertical movement of the latter is provided in the rear wall of the hollow square column 19. The angle θ at which the pallet 7 starts its free sliding movement is given by the equation:

$$\theta = \sin^{-1}\left(\mu \cdot \frac{d}{D} \cdot \frac{n}{W}\right)$$

where $n$ is the number of rollers 30 with which the pallet 7 makes sliding contact, D is the diameter of the roller 30, $d$ is the diameter of the journal portion of the roller 30, $\mu$ is the coefficient of friction of the roller journal portion, and W is the weight of the pallet 7. Accordingly, the inclination of the carrier member 25 during its upper position may be so determined as to be slightly larger than the angle θ specified above.

Referring again to FIG. 1, the pallet returning unit 9 includes a pallet receiving member 31 which has a built-in roller conveyor. The pallet receiving member 31 is pivotally connected at one end to the base 1, while the top end of the piston slidably received in a fluid-operated cylinder such as an air cylinder 32 is pivotally connected to the other or free end of the pallet receiving member 31. The air cylinder 32 is firmly secured to the base 1. Thus, the pallet receiving member 31 is capable of making a swinging movement between its upper position shown by the solid lines at which it aligns with the roller conveyor 18 of the self-rolling type and its lower position, shown by the one-dot chain lines, at which it aligns with the pallet returning conveyor 10.

Figure 5:
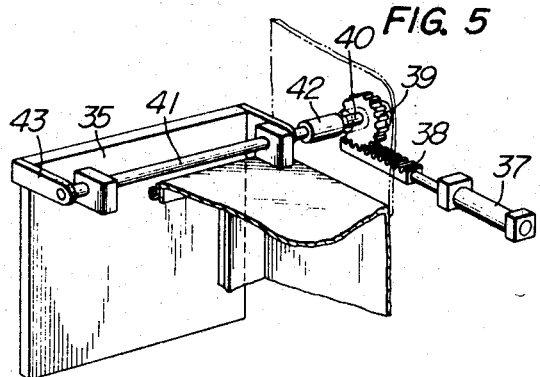
FIG. 5 is a perspective view of the opening and closing mechanism shown in FIG. 4.
Figure 6:
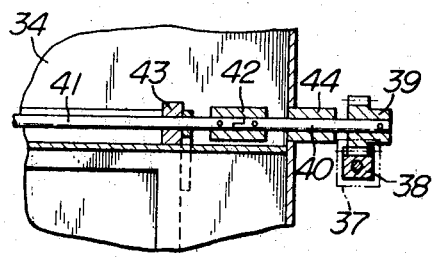
FIG. 6 is an enlarged cross-sectional view of part of FIG. 4.

An opening and closing mechanism for a gate 35 opening and closing the inlet 33 of the heating chamber 2 is shown in FIGS. 4, 5 and 6. The same mechanism is also provided for a gate 36 opening and closing the outlet 34 of the heating chamber 2. The gate opening and closing mechanism includes a fluid-operated cylinder such as an air cylinder 37 slidably receiving therein a piston whose head portion is provided with a rack 38 which is in meshing engagement with a pinion 39 so that the pinion 39 can rotate in one direction and the other in response to a reciprocating movement of the piston in the air cylinder 37. The pinion 39 is mounted on a shaft 40 which is directly coupled by a coupling 42 to a metal shaft 41 for causing the opening and closing movement of the gate 35 (36) opening and closing the inlet 33 (outlet 34) of the heating chamber 2. The gate 35 (36) is indirectly secured to the shaft 41 by means of spacer arms 43 providing a spacing $l$ between the inner face of the gate 35 (36) and the shaft 41, and thus the range in which the free end of the gate moves in the opening and closing operation, as shown by the one-dot chain line, becomes smaller than when the shaft 41 is directly disposed on the inner face of the gate. Accordingly, the pallet 7 loaded with an article 57 would not strike against the gate 35 (36) even when the gate 35 (36) is opened in the phase in which the pallet 7 fairly approaches the gate 35 (36). It is thus possible to shorten the length of the front auxiliary chamber 3 and the rear auxiliary chamber 4, which is quite effective for the reduction of the overall length of the heating apparatus. The shaft 40 mounting the pinion 39 is made from a material such as polypropylene or urea resin and thus provides a positive seal against leakage of the radio wave through the shaft portion extending through a bearing 44 secured to a side wall of the front auxiliary chamber 3 (rear auxiliary chamber 4).

Those elements of the gate opening and closing mechanism including the air cylinder 37, rack 38 and pinion 39 are disposed outside the heating chamber 2, and the shaft 41 acting as the swinging axis of the gate 35 (36) is solely disposed for rotation within the front auxiliary chamber 3 (rear auxiliary chamber 4), which arrangement obviates any damage to the mechanism due to electric discharge. An air cylinder 37 of the kind having a cushioning effect is employed herein so as to mitigate the impact that may be imparted to radio wave sealing springs 45 provided at the upper and lower end edges of the inlet 33 (outlet 34) when the gate 35 (36) is forced onto the springs 45 to close the inlet 33 (outlet 34), thus avoiding deformation of the springs 45 and extending the service life thereof.

The inlet 46 of the front auxiliary chamber 3 disposed on the front side of the heating chamber 2 and the outlet 47 of the rear auxiliary chamber 4 disposed on the rear side of the heating chamber 2 are opening and closed by respective shutters 48 and 49 as shown in FIG. 1. The same mechanism is employed for the opening and closure of each of the shutters 48 and 49. More precisely, a chain 50 having one end thereof anchored to the shutter 48 (49) is passed around a sprocket 52, which is pivoted to an upright 51, to be anchored at the other end thereof to a sprocket 54 which is coaxial with a pinion 53. The pinion 53 is in meshing engagement with a rack 56 secured to the head portion of a piston slidably received in a fluid-operated cylinder such as an air cylinder 55. It will be understood therefore that the chain 50 is taken up on or uncoiled from the sprocket 54, which is coaxial with the pinion 53 and rotates in unitary relation with the pinion 53 in response to a reciprocating movement of the piston, thereby opening or closing the shutter 48 (49).

Figure 7A:
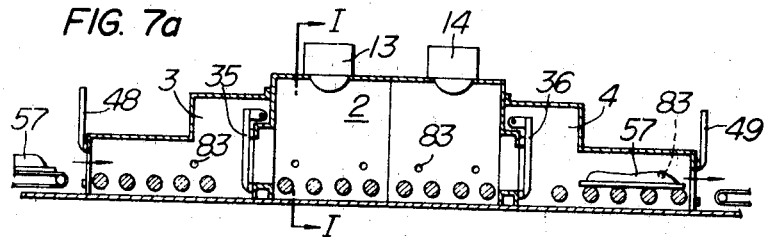
FIGS. 7a, 7b, 7c and 7d are schematic vertical sectional views of the high frequency heating apparatus, illustrating how the gates opening and closing the heating chamber and auxiliary chambers are opened and closed relative to each other.
Figure 7B:
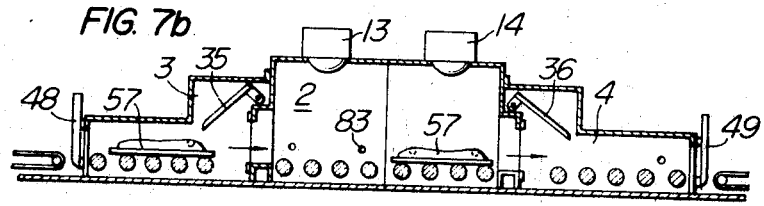
Figure 7C:
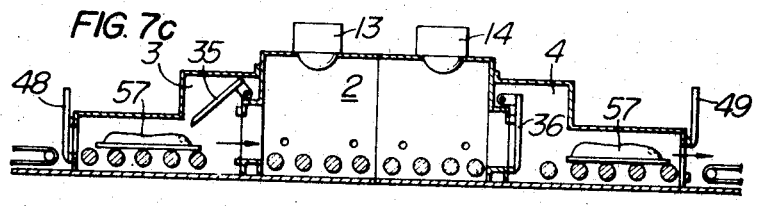
Figure 7D:
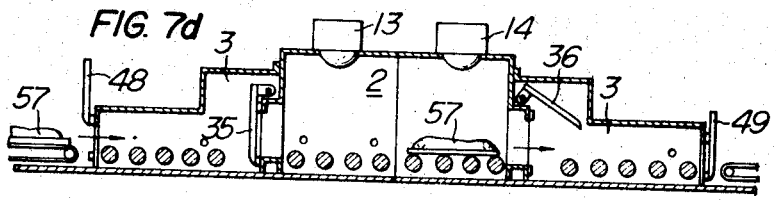

The opening and closing mechanisms for the gates 35 and 36 for the heating chmber 2 and the shutters 48 and 49 for the front auxiliary chamber 3 and the rear auxiliary chamber 4 are designed to operate in such a way that the heating chamber 2 is always isolated from the atmosphere by the gates 35 and 36, or by the shutters 48 and 49, or by the gate 35 and the shutter 49, or by the gate 36 and the shutter 48 so as to prevent the radio wave from escaping outwardly. Therefore, the gates 35 and 36 are closed while the shutters 48 and 49 are opened when an article 57 to be heated is admitted into the front auxiliary chamber 3 and a heated article 57 is taken out of the rear auxiliary chamber 4 as shown in FIG. 7a. The shutters 48 and 49 are closed while the gates 35 and 36 are opened when an article 57 to be heated is transferred from the front auxiliary chamber 3 into the heating chamber 2 and a heated article 57 is transferred from the heating chamber 2 into the rear auxiliary chamber 3 as shown in FIG. 7b. Further, the shutter 48 and the gate 36 are closed while the shutter 49 and the gate 35 are opened when an article 57 to be heated is transferred from the front auxiliary chamber 3 into the heating chamber 2 while a heated article 57 is discharged outwardly from the rear auxiliary chamber 4 as shown in FIG. 7c. Furthermore, the gate 35 and the shutter 49 are closed while the gate 36 and the shutter 48 are opened when an article 57 to be heated is admitted into the front auxiliary chamber 3 while a heated article 57 is transferred from the heating chamber 2 into the rear auxiliary chamber 4 as shown in FIG. 7d.

Figure 8A:
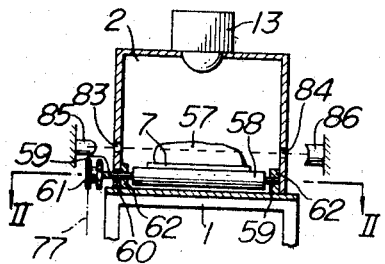

In FIG. 8a which is a sectional view taken on the line I—I in FIG. 7a, the transfer conveyors 11 and 12 comprise a series of parallel rollers 58. Each roller 58 is mounted on a shaft 59 which is journaled in bearings 62. One end of the shaft 59 extends through a through hole 60 in one side wall of the heating chamber 2 and carries thereon a sprocket 61. A chain (not shown) is trained around the sprockets 61 so that all the shafts 59, hence the rollers 58 can simultaneously be driven from a motor described later. The shaft 59 is made from an electrical insulator such as a plastic material in order to prevent external leakage of the radio wave from the through hole 60. Furthermore, the bearings 62 are made from an electrical conductor in order to ensure complete freedom from external leakage of the radio wave from the through hole 60. A structure similar to the above is employed for the transfer conveyors 15 and 16 disposed in the front auxiliary chamber 3 and the rear auxiliary chamber 4 for the same purpose described above.

As shown in FIG. 8b which is a sectional view taken on the line II—II in FIG. 8a, each of the shafts 59 is provided with the sprocket 61 consisting of double toothed chain wheel at said one end of the shaft. One of these shafts is connected with a motor 71 fitted to the base 1 through a chain 77 and the sprocket 61 provided therebetween and therefore driven from the motor, which shaft in turn is connected with another saft adjacent thereto by another chain and therefore transmits the revolution thereof to said another shaft and so on. Since respective two shafts adjacent to each other are alternately connected by the chain provided between the two shafts, the rotating speeds of the entire shafts are made precisely equal to one other and the pallets 7 loaded with the heated articles thereon are precisely and uniformly transferred. Each of the transfer conveyors 11, 12, 15 and 16 of the front auxiliary chamber 3, heating chamber 2 and rear auxiliary chamber 4 is provided with a transmitting mechanism similar to that just described above.

Figure 9:
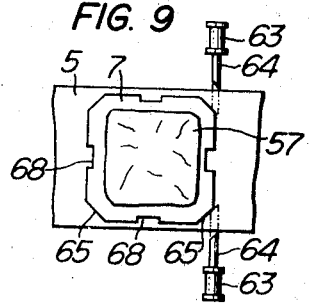
FIG. 9 is a plan view showing a pallet being carried by a supply conveyor in its circulating movement through the high frequency heating apparatus.

FIG. 9 is a top plan view showing an article 57 being conveyed by the supply conveyor 5. The pallet 7 is made from a material having a low value of dielectric constant by power factor such as, for example, polypropylene or fluorine-contained resin in order that it may not be deformed or fused when bombarded by the radio wave and an undesirable electric discharge may not be given rise to in the heating chamber 2. Since the pallets 7 carrying thereon an article 57 to be heated are to be transferred one after another at predetermined time intervals by the supply conveyor 5, the corners of each pallet 7 are beveled to provide abutments 65 which are engageable with stoppers 64 actuated by fluid-operated cylinders such as air cylinders 63 in order that the position of the pallet 7 at the loading station can thereby be regulated. Regulation of the position of the pallet 7 is also necessary in order that the pallets 7 successively returned to the front end of the returning conveyor 10 in FIG. 1 after unloading the treated article 57 are taken up one by one by the pallet lifting unit 8. Since the pallet 7 at such a position is not loaded with the article 57, a stopper 67 actuated by a fluid-operated cylinder such as an air cylinder 66 may be provided to retain the pallet 7 in position. For this purpose, cutouts 68 are provided at the central portion of opposite sides of the pallet 7 so that one of them may be engaged by the stopper 67 moving downwardly from above.

Referring to FIG. 1, motors 69, 70, 71, 72, 73 and 74 are provided to drive the conveyors 5, 15, 11, 12, 16 and 6 through chains 75, 76, 77, 78, 79 and 80, respectively. A control box 81 at the front end of the apparatus contains therein electrical equipment such as time switches (not shown) for controlling the duration of heating depending on the kind of articles to be heated and microswitches (not shown) for actuating the air cylinders. A brake means 82 is associated with the pallet returning conveyor 10 in order to control the return speed of the unloaded pallets 7 thereby to ensure safe return of the pallets 7.

Referring to FIG. 8a again, a plurality of aligned perforations 83 and 84 are provided in the opposite side walls of the heating chamber 2 and have such a small diameter which will sufficiently avoid external leakage of the high frequency energy (radio wave) from the heating chamber 2. A source of light such as a lamp 85 is disposed outside the heating chamber 2 in close proximity to each perforation 83, and a photoelectric device such as a phototube 86 is disposed outside the heating chamber 2 in close proximity to each perforation 84. Thus, the light emitted from the light source 85 passes through the aligned perforations 83 and 84 to reach the phototube 86 by way of a path as shown by the broken line in FIG. 8a. It will be apparent that, when an article 57 to be heated is present in the heating chamber 2, the light emitted from the light source 85 is intercepted by the article 57 and cannot reach the phototube 86. Two photoelectric detecting units each consisting of the light source 85, the perforations 83 and 84, and the phototube 86 are associated with each of the cabinets constituting the heating chamber 2, with one disposed at a position corresponding to the front half portion of the cabinet and the other disposed at a position corresponding to the rear half portion of the cabinet, so that the position of the article within the heating chamber 2 can very precisely be detected.

The operation of the high frequency heating apparatus embodying the present invention will now be described in detail. An article 57 to be heated is loaded on the pallet 7 when the latter is brought onto the supply conveyor 5 at the loading station. When no article 57 is present in the front auxiliary chamber 3, a signal from an associated phototube (not shown) actuates the air cylinder 55 with the result that the shutter 48 is lifted to its open position, and at the same time, the supply conveyor 5 starts to rotate to convey the pallet 7 loaded with the article 57 into the front auxiliary chamber 3. As soon as the article 57 is carried into the front auxiliary chamber 3, the shutter 48 is lowered to its closed position again. When, in this case, no article 57 is present in the heating chamber 2, a signal from the associated phototubes 86 actuates the front air cylinder 37 with the result that the gate 35 is urged to its open position, and at the same time, the transfer conveyors 15 and 11 start to rotate to convey the article 57 to a predetermined position within the heating chamber 2. The article 57 so placed in the predetermined position within the heating chamber 2 is detected by the fact that the paths of light from the two light sources 85 to the corresponding phototubes 86 are intercepted by the article 57. The phototubes 86 deliver a signal by detecting the presence of the article 57 within the heating chamber 2 so that the transfer conveyors 15 and 11 are brought to a halt and the gate 35 is urged to its closed position. At the same time, the magnetrons 13 and 14 are energized to direct the high frequency energy (radio wave) to the article 57 to heat the same.

After the article 57 is heated with the radio wave generated by the magnetrons 13 and 14 for a predetermined period of time, the time switch actuates the rear air cylinder 37 with the result that the gate 36 is urged to its open position, and the transfer conveyors 12 and 16 start to rotate to convey the heated article 57 into the rear auxiliary chamber 4, the gate 36 being then urged to its closed position again while the conveyors 12 and 16 being brought to a halt. Confirming the absence of any article 57 on the delivery conveyor 6, the air cylinder 55 is actuated to lift the shutter 49 to its open position, and at the same time, the transfer conveyor 16 starts to rotate again to carry the article 57 onto the continuously rotating delivery conveyor 6. The shutter 49 is then urged to its closed position again and the heated article 57 is unloaded from the pallet 7 at the unloading station. The unloaded pallet 7 alone is driven by the force of transfer imparted thereto by the delivery conveyor 6 so that the pallet 7 moves over the conveyor 18 of the self-rolling type onto the pallet receiving member 31 of the pallet returning unit 9. As soon as the pallet 7 rides on the receiving member 31, the air cylinder 32 is actuated to cause the tilting movement of the receiving member 31 to a position as shown by the one-dot chain lines. The pallet 7 thereby starts its gravitational sliding movement to move onto the returning conveyor 10 to be returned to the front end of the conveyor 10. At the front end of the conveyor 10, the pallet 7 is locked in position temporarily by being engaged by the stopper 67, and upon confirmation of the absence of any preceding pallet 7 on the carrier member 25 of the pallet lifting unit 8, the air cylinder 66 is actuated to disengage the stopper 67 from the pallet 7, which then rides onto the carrier member 25. The carrier member 25 is then lifted to the position shown by the one-dot chain lines in FIG. 3, at which position the free end of the carrier member 25 is lowered relative to the pivoted end thereof, with the result that the pallet 7 starts to make its gravitational sliding movement, thus leaving the carrier member 25 and passing over the self-rolling conveyor 17 by inertia to return to its previous position on the supply conveyor 5, in which position the pallet 7 is temporarily locked by the stoppers 64. An article 57 is loaded on the pallet 7 at the loading station, and upon confirmation of the absense of any article 57 within the front auxiliary chamber 3, the pallet 7 loaded with the article 57 is conveyed again into the heating chamber 2 in the manner described above. Thus, articles 57 loaded on the pallets 7 can successively be heat-treated for the purpose of sterilization or the like.

It will be understood from the foregoing description that, in the high frequency heating apparatus according to the present invention, the pallet 7 can fully automatically be circulated through the apparatus, during which cycle the pallet 7 is loaded with an article 57 and is conveyed through the heating chamber 2 for the heat-treatment of the article 57. Thus, no man-power is required at all except that the article 57 is loaded on the pallet 7 at the loading station and the heat-treated article 57 is unloaded from the pallet 7 at the unloading station, thereby greatly improving the efficiency of the heating operation.

Furthermore, by virtue of the provision of the gates 48 and 35, which are arranged so as not to open simultaneously, at the inlet 46 of the front auxiliary chamber 3 and at the inlet 33 of the heating chamber 2, respectively, and the provision of the gates 36 and 49, which are also arranged so as not to open simultaneously, at the outlet 34 of the heating chamber 2 and at the outlet 47 of the rear auxiliary chamber 4, respectively, the article 57 can be conveyed into and out of the heating chamber 2 without even a momentary interruption of the supply of high frequency energy (radio wave) radiated from the magnetrons 13 and 14 while avoiding the objectionable leakage of the high frequency energy (radio wave) to the exterior of the heating chamber 2. Thus, there is no wasteful loss of heating time with the resultant remarkable improvement in heating efficiency, and the service life of the on-off switches of the magnetrons 13 and 14 will not be shortened at all.

It will be noted that the transfer conveyors 11 and 12 disposed in the heating chamber 2 comprise the rollers 58 arranged in parallel with each other and each roller 58 is mounted on the shaft 59 of an electrical insulator, the shafts 59 having one end thereof projected outwardly through the side wall of the heating chamber 2 to be operatively connected at the projected ends with external drive means so that the rotating force transmitted from the drive means can drive the transfer conveyors 11 and 12 independently of each other. The above arrangement eliminates the need for the provision of a belt conveyor passing through the heating chamber 2, which obviates objectionable leakage of the high frequency energy (radio wave) through the penetrating portions of the conveyor belt, and thus eliminates the need for the supply of water for the purpose of absorption of the leaking radio wave. The above arrangement is quite useful in that the high frequency energy (radio wave) can efficiently be absorbed by an article to be heat-treated. Moreover, the fact that the roller shafts 59 penetrating the side wall of the heating chamber 2 are made from a plastic or like electrical insulator ensures the positive inhibition of external leakage of the radio wave through the through holes 60 in the side wall of the heating chamber 2.

It will be noted further that the aligned perforations 83 and 84 are provided in the opposite side walls of the heating chamber 2 so that the light from the light sources 85 can pass freely through the perforations 83 and 84 to reach the phototubes 86 to energize the same in the absence of any article within the heating chamber 2, while an article 57 conveyed into the heating chamber 2 intercepts the path of light to deenergize the phototubes 86. Thus, the article 57 brought to the predetermined position within the heating chamber 2 for the sake of heat-treatment can be detected unfailingly by the phototubes 86, and a signal delivered in response to the deenergization of the phototubes 86 may be utilized to control, for example, the operation of the transfer conveyors 15, 11, 12 and 16 which convey the article 57, the opening and closing movement of the gates 35 and 36 for the heating chamber 2, or the operation of the magnetrons 13 and 14 so as to positively prevent the article 57 from striking against the gates 35 and 36 during the opening or closing movement of the latter and prevent the magnetrons 13 and 14 from being wastefully energized in the absence of the article 57 within the heating chamber 2.

It will be noted further that the pallet lifting unit 8 comprises the movable block 23 arranged for vertical movement by being driven by the air cylinder 20 or any other suitable actuator, the pallet carrier member 25 swingably pivoted at one end thereof to the movable block 23, the aligned vertical slots 26 which are curved at the top end to incline toward the carrier member 25, and the links 27 which are each freely movably fitted at one end in the slots 26 and connected at the other end to the carrier member 25 so that the carrier member 25 can normally be supported in a position in which its free end is slightly higher than the pivoted end, but as the carrier member 25 is lifted upwardly, those ends of the links 27 fitting in the slots 26 are guided into the inclined portion of the slots 26 to tilt the carrier member 25 in a position in which its free end is now slightly lower than the pivoted end. Thus, mere provision of the actuator and associated means for causing the vertical movement of the carrier member 25 can effect the dual purpose of lifting the pallet 7 and delivering it to the loading station, which leads to a great advantage that the pallet lifting unit 8 has a very simple structure and can economically be constructed to suit the purpose. A further advantage resides in the capability of exact delivery of the pallet 7 without any time lag since the pallet 7 is gravitationally delivered from the carrier member 25 as soon as the carrier member 25 is raised up to its upward position. Another advantage derivable from the above arrangement is that the pallet 7 will not fall off the carrier member 25 during the movement of the latter from its lower to its upper position in spite of some sort of vibrations imparted thereto because the carrier member 25 is held in its slightly upwardly inclined state during the upward movement.

Furthermore, it will be noted that the swinging gates 35 and 36 opening and closing the inlet 33 and the outlet 34 of the heating chamber 2 are disposed in such a relationship that a suitable spacing is provided between their inner wall face and the shaft 41 forming the swinging axis of the gate. By this arrangement, the gates 35 and 36 travel a far shorter distance during their opening and closing movement than when they are directly mounted on a shaft which is disposed on the face of their inner wall, and thus the gates 35 and 36 can very quickly be opened and closed. Therefore, the gate 35 may be opened when an article 57 carried by the transfer conveyor 15 has fairly approached the gate 35 in its way to the heating chamber 2, without causing a collision between the article 57 and the gate 35. Similarly, the article 57 in its way out of the heating chamber 2 could not collide with the gate 36 even when the article 57 starts to move substantially simultaneously with the opening movement of the gate 36. Thus, the article 57 can be conveyed into and out of the heating chamber 2 with a shortened time required therefor, and this advantage is especially important in that it meets the essential requirement for a high frequency heating aparatus which must be capable of heat-treatment of articles within a short period of time. Moreover, the above advantage leads to a reduction of the length of the front auxiliary chamber 3 and the rear auxiliary chamber 4, and hence a reduction in the overall length of the high frequency heating apparatus.

What is claimed is:

1. An apparatus for microwave heating of articles of conveying type comprising a high frequency heating chamber, a front auxiliary chamber disposed on the front side of said heating chamber in contiguous relation thereto, a rear auxiliary chamber disposed on the rear side of said heating chamber in contiguous relation thereto, a supply conveyor and a delivery conveyor for conveying articles into and out of said chambers, a pallet lifting unit disposed on the front side of said supply conveyor, a pallet returning unit disposed on the rear side of said delivery conveyor, a pallet returning conveyor disposed between said pallet lifting unit and said pallet returning unit, a pallet circulation path including said supply conveyor, said delivery conveyor, said pallet returning unit, said pallet returning conveyor and said pallet lifting unit, a pair of gates, respectively provided at the inlet of said front auxiliary chamber and the inlet of said heating chamber and adapted so as not to be opened simultaneously, a pair of gates respectively provided at the outlet of said heating chamber and the outlet of said rear auxiliary chamber and adapted so as not to be opened simultaneously, a photoelectric means consisting of a light source and a light receiver provided oppositely on both side walls of at least one of said chambers and generating a control signal so as not to open simultaneously the gates in said each pair.

2. A microwave heating apparatus of conveying type as defined in claim 1, further comprising a plurality of transfer conveyors disposed in said heating chamber and said auxiliary chambers, roller shafts for said transfer conveyors being made of an electric insulating material, one end of said shaft extending outwardly through each of the walls of said heating chamber and said auxiliary chambers, plain bearings for supporting said roller shaft, and a pulley fitted to the projected end of said roller shaft and transferring a revolving force to said roller shaft.

3. A microwave heating apparatus of conveying type as defined in claim 1, further comprising pairs of small perforations provided in the opposite side walls of said heating chamber so as to form a path of light, said perforations having such a diameter that the radio wave radiated within said heating chamber may not leak externally therethrough, said light source being disposed outside said heating chamber in close proximity to said perforation, and said light receiver being disposed outside said heating chamber in close proximity to said perforation.

4. A microwave heating apparatus of conveying type as defined in claim 1, in which said pallet lifting unit consists of a movable block arranged for vertical movement actuated by a driving means, a pallet carrier member swingably pivoted at one end thereof to said movable block, vertical guide slots whose upper end portion is inclined toward said pallet carrier member, and link means whose one end is freely movably fitted in said guide slots while other end is connected to said pallet carrier member for slightly upwardly supporting said pallet carrier member.

5. A microwave heating apparatus of conveying type as defined in claim 1, in which said gates are disposed outside the inlet and the outlet of said heating chamber respectively, shafts for opening and closing said gates disposed in parallel with the upper edge of the gates in such a relationship that a constant distance is provided between the inner wall face of said gates and said shafts.

References Cited

UNITED STATES PATENTS

| 2,467,230 | 4/1949 | Revercomb et al. | 219—10.55 |
| 2,583,338 | 1/1952 | Morse et al. | 219—10.55 |
| 3,422,239 | 1/1969 | Ojelid | 219—10.55 |

FOREIGN PATENTS

| 1,112,642 | 5/1968 | Great Britain. |

JOSEPH V. TRUHE, Primary Examiner

LUTHER H. BENDER, Assistant Examiner

U.S. Cl. X.R.

219—10.61